United States Patent
Yeo et al.

(10) Patent No.: US 9,374,575 B2
(45) Date of Patent: Jun. 21, 2016

(54) METHOD OF PROCESSING THREE-DIMENSIONAL IMAGE DATA AND A DISPLAY APPARATUS FOR PERFORMING THE SAME

(75) Inventors: Jang-Hyun Yeo, Seoul (KR); Jae-Wan Park, Seoul (KR); Kyoung-Phil Kim, Cheonan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 990 days.

(21) Appl. No.: 13/241,408

(22) Filed: Sep. 23, 2011

(65) Prior Publication Data

US 2012/0249522 A1  Oct. 4, 2012

(30) Foreign Application Priority Data

Mar. 28, 2011  (KR) ........................ 10-2011-0027402

(51) Int. Cl.
| | |
|---|---|
| G06T 15/00 | (2011.01) |
| H04N 13/04 | (2006.01) |
| H04N 13/00 | (2006.01) |

(52) U.S. Cl.
CPC ....... *H04N 13/0497* (2013.01); *H04N 13/0066* (2013.01); *G09G 2370/04* (2013.01); *G09G 2370/14* (2013.01)

(58) Field of Classification Search
CPC .............. G09G 2300/0452; G09G 2310/0254; G09G 2310/0275; G09G 2320/0247; G09G 3/003; G09G 3/20; G09G 5/393; G09G 5/395; G09G 5/42; G09G 2340/02; G09G 2370/04; G09G 2370/14; G09G 2370/047; G09G 2370/10; G09G 2370/12; G09G 2370/16; G09G 2370/22; G09G 5/005; G09G 5/006; G09G 5/12; H04N 13/0029; H04N 13/0037; H04N 13/0048; H04N 13/0059; H04N 13/0404; H04N 13/0422; H04N 13/0066; H04N 13/0497; H04N 21/4122; H04N 21/4147; H04N 21/43632; H04N 21/4402; H04N 2213/003

USPC .................... 345/419, 697; 348/42, E13.001
See application file for complete search history.

(56) References Cited

U.S. PATENT DOCUMENTS

| | | | |
|---|---|---|---|
| 5,012,351 A | * | 4/1991 | Isono .................. H04N 5/7605 348/42 |
| 6,529,175 B2 | | 3/2003 | Tserkovnyuk et al. |

(Continued)

FOREIGN PATENT DOCUMENTS

| | | |
|---|---|---|
| CN | 1344116 A | 4/2002 |
| CN | 101587691 A | 11/2009 |

(Continued)

OTHER PUBLICATIONS

Anonymous, "High-Definition Multimedia Interface Specification Version 1.4a Extraction of 3D Signaling Portion", High-Definition Multimedia Interface Specification, Mar. 4, 2010, pp. 1-28, XP-002677171.

(Continued)

*Primary Examiner* — Sath V Perungavoor
*Assistant Examiner* — Dakshesh Parikh
(74) *Attorney, Agent, or Firm* — Cantor Colburn LLP

(57) ABSTRACT

A method of processing three-dimensional image data includes demodulating a first transmission signal into image data which is image data for a left-eye or image data for a right-eye, wherein the first transmission signal is received during an enable period of a frame; demodulating a second transmission signal into identification data, where the second transmission signal is received during a blanking period of the frame, and the identification data identifies the image data of a subsequent frame; identifying whether the image data of the subsequent frame is the image data for the left-eye or the image data for the right-eye based on the identification data; and processing the image data based on an identified result from the identifying whether the image data of the subsequent frame is the image data for the left-eye or the image data for the right-eye.

18 Claims, 7 Drawing Sheets

(56) References Cited

U.S. PATENT DOCUMENTS

| | | |
|---|---|---|
| 2005/0212744 A1 | 9/2005 | Hada et al. |
| 2009/0284455 A1 | 11/2009 | Jung |
| 2010/0182402 A1* | 7/2010 | Nakajima ............. G09G 5/006 348/42 |
| 2010/0265284 A1* | 10/2010 | Satou ................... G09G 3/003 345/697 |
| 2011/0050863 A1 | 3/2011 | Choi et al. |

FOREIGN PATENT DOCUMENTS

| | | |
|---|---|---|
| CN | 101803382 A | 8/2010 |
| CN | 101866644 A | 10/2010 |
| CN | 101877795 A | 11/2010 |
| CN | 101904175 A | 12/2010 |
| CN | 101933336 A | 12/2010 |
| EP | 2348748 A2 | 7/2011 |
| JP | 1995-048883 B2 | 5/1995 |
| JP | 09116931 A | 5/1997 |
| JP | 2009075392 A | 4/2009 |
| JP | 2010-093740 A | 4/2010 |
| JP | 2011030176 A | 2/2011 |
| KR | 1020020027413 A | 4/2002 |
| WO | 2010050084 A1 | 5/2010 |

OTHER PUBLICATIONS

Examination Report for Application No. 11 191 636.7-1902 dated Aug. 12, 2013.

European Office Action for Application No. 11191636.7-1902/ 2506583 dated Aug. 3, 2015.

* cited by examiner

FIG. 2A

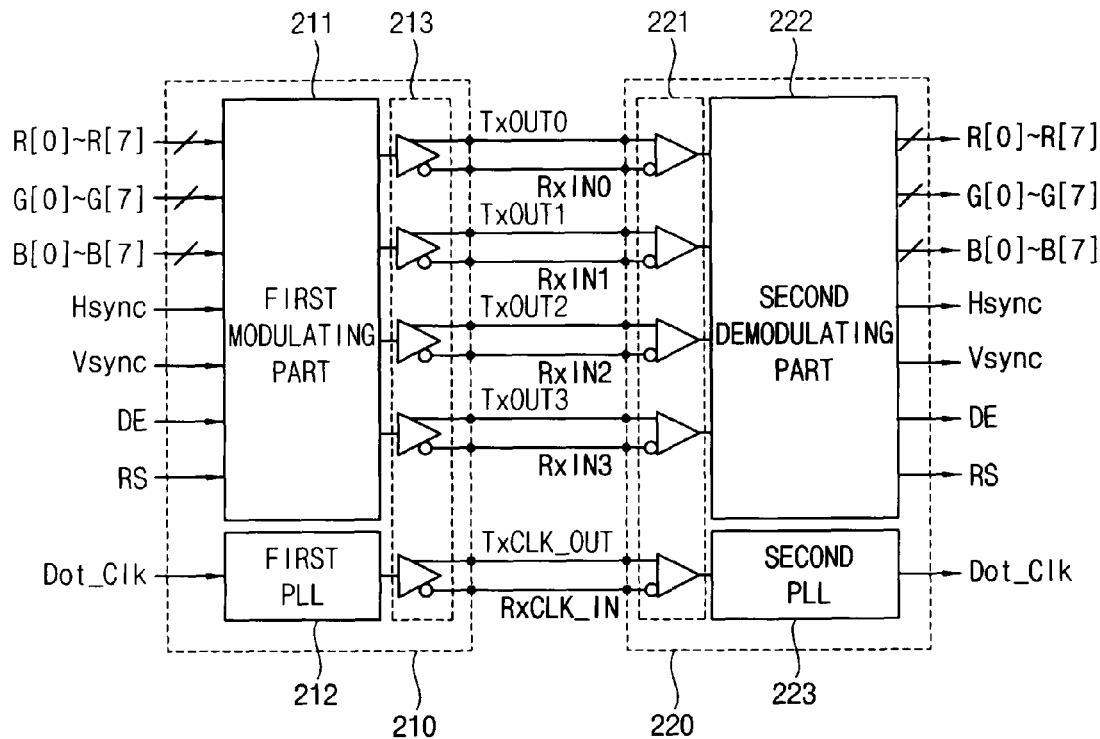

FIG. 2B

| DEVICE PIN NAME | SIGNAL | DEVICE PIN NAME | SIGNAL |
|---|---|---|---|
| TxCLK_IN/RxCLK_OUT | Dot_Clk | TxIN13/RxOUT13 | G[4] |
| TxIN0/RxOUT0 | R[0] | TxIN14/RxOUT14 | G[5] |
| TxIN1/RxOUT1 | R[1] | TxIN15/RxOUT15 | B[0] |
| TxIN2/RxOUT2 | R[2] | TxIN16/RxOUT16 | B[6] |
| TxIN3/RxOUT3 | R[3] | TxIN17/RxOUT17 | B[7] |
| TxIN4/RxOUT4 | R[4] | TxIN18/RxOUT18 | B[1] |
| TxIN5/RxOUT5 | R[7] | TxIN19/RxOUT19 | B[2] |
| TxIN6/RxOUT6 | R[5] | TxIN20/RxOUT20 | B[3] |
| TxIN7/RxOUT7 | G[0] | TxIN21/RxOUT21 | B[4] |
| TxIN8/RxOUT8 | G[1] | TxIN22/RxOUT22 | B[5] |
| TxIN9/RxOUT9 | G[2] | TxIN23/RxOUT23 | RS |
| TxIN10/RxOUT10 | G[6] | TxIN24/RxOUT24 | Hsync |
| TxIN11/RxOUT11 | G[7] | TxIN25/RxOUT25 | Vsync |
| TxIN12/RxOUT12 | G[3] | TxIN26/RxOUT26 | DE |
| | | TxIN27/RxOUT27 | R[6] |

METHOD OF PROCESSING THREE-DIMENSIONAL IMAGE DATA AND A DISPLAY APPARATUS FOR PERFORMING THE SAME

This application claims priority to Korean Patent Application No. 2011-0027402, filed on Mar. 28, 2011, and all the benefits accruing therefrom under 35 U.S.C. §119, the content of which in its entirety is herein incorporated by reference.

BACKGROUND OF THE INVENTION

1. Field of the Invention

Exemplary embodiments of the invention relate to a method of processing three-dimensional ("3D") image data and a display apparatus for performing the method. More particularly, exemplary embodiments of the invention relate to a method of processing 3D image data with improved display quality of the 3D stereoscopic image and a display apparatus for performing the method.

2. Description of the Related Art

Generally, a display device displays a two-dimensional ("2D") image. Recently, a stereoscopic image display apparatus that displays a 3D stereoscopic image has been developed since demands for the 3D stereoscopic image has been increased in various industrial fields such as games, movies and so on.

Generally, a stereoscopic image display device displays a 3D stereoscopic image using a principle of binocular parallax through two eyes of human. For example, since two eyes of human are spaced apart from each other, images viewed at the different angles are inputted to the brain of human. Thus, the observer may perceive the 3D stereoscopic image through the display device.

The stereoscopic image display device is classified into a stereoscopic type with an extra spectacle and an auto-stereoscopic type without the extra spectacle. The stereoscopic type includes an analyph type and a liquid crystal shutter stereoscopic type, for example. In the analyph type, a view may wear blue and red glasses corresponding to two eyes of the viewer, respectively. In the liquid crystal shutter stereoscopic type, a left image and a right image are temporally divided to be periodically displayed, and the viewer wears glasses which sequentially open or close a left eye liquid crystal shutter and a right eye liquid crystal shutter in synchronization with the displaying period of the left and right images.

As described above, the display device displaying the 3D stereoscopic image may include a signal for identifying the data for a left-eye and a right-eye to process data for the left-eye and the right-eye and to display the image for the left-eye and the right-eye. The data is not synchronized with a control signal to process the data without the signal for identifying the data for the left-eye and the right-eye, such that display quality of the 3D stereoscopic image is substantially decreased.

BRIEF SUMMARY OF THE INVENTION

Exemplary embodiments of the invention provide a method of processing a three-dimensional ("3D") image data with simplified transmission of an identification signal that identifies image data for a left-eye and a right-eye.

Exemplary embodiments of the invention also provide a display apparatus for performing the method of processing the 3D image data.

According to an exemplary embodiment of the invention, a method of processing 3D image data includes demodulating a first transmission signal into image data which is image data for a left-eye or image data for a right-eye, wherein the first transmission signal is received during an enable period of a frame; demodulating a second transmission signal into identification data, where the second transmission signal is received during a blanking period of the frame, and the identification data identifies the image data of a subsequent frame; identifying whether the image data of the subsequent frame is the image data for the left-eye or the image data for the right-eye based on the identification data; and processing the image data based on an identified result from the identifying whether the image data of the subsequent frame is the image data for the left-eye or the image data for the right-eye.

In an exemplary embodiment, the method of processing 3D image data may further include modulating the image data into the first transmission signal and transmitting the first transmission signal during the enable period, and modulating the identification data into the second transmission signal and transmitting the second transmission signal during the blanking period.

In an exemplary embodiment, the modulating the image data into the first transmission signal may include modulating the image data into a first pulse signal, and modulating the first pulse signal into a pair of first differential signals having phases opposite to each other.

In an exemplary embodiment, the demodulating the first transmission signal into the image data may include receiving the pair of first differential signals and demodulating the pair of first differential signals into the first pulse signal, and demodulating the first pulse signal into the image data.

In an exemplary embodiment, the modulating the identification data into the second transmission signal may include modulating the identification data which is identification data for the left-eye or identification data for the right-eye into a second pulse signal, where the identification data for the left-eye corresponds to the image data for the left-eye, and the identification data for the right-eye corresponds to the image data for the right-eye, and modulating the second pulse signal into a pair of second differential signals having phases opposite to each other.

In an exemplary embodiment, the demodulating the second transmission signal into the identification data for may include receiving the pair of second differential signals and demodulating the second differential signals into the second pulse signal, and demodulating the second pulse signal into the identification data.

In an exemplary embodiment, the identifying whether the image data of the subsequent frame are the image data for the left-eye or the image data for the right-eye may include detecting the identification data during a preset period in the blanking period, and determining whether the image data of the subsequent frame is the image data for the left-eye or the image data for the right-eye using the identification data detected during the preset period.

In an exemplary embodiment, the method of processing 3D image data may further include generating an inversion control signal which controls a polarity of a data voltage corresponding to the image data based on the identified result.

In an exemplary embodiment, the processing the image data may include converting the image data into the data voltage, and outputting a voltage of different polarities with respect to a reference voltage as the data voltage based on the inversion control signal.

According to another exemplary embodiment of the invention, a display apparatus includes a display panel which displays an image, a signal receiving part which receives a first transmission signal during an enable period of a frame and receives a second transmission signal during a blanking period of the frame, where the signal receiving part demodulates the first transmission signal into image data which is image data for a left-eye or image data for a right-eye, and demodulates the second transmission signal into identification data which identifies the image data of a subsequent frame, a timing control part which detects the identification data and identifies whether the image data of the subsequent frame is the image data for the left-eye or the image data for the right-eye, and a panel driving part which processes the image data based on an identified result from the timing control part.

In an exemplary embodiment, the display apparatus may further include a signal transmitting part which modulates the image data into the first transmission signal to transmit the first transmission signal during the enable period, and modulates the identification data into the second transmission signal to transmit the second transmission signal during the blanking period.

In an exemplary embodiment, the signal transmitting part may include a data channel which receives the image data and the identification data, and a control channel which receives a control signal.

In an exemplary embodiment, the display apparatus may further include a scaler which provides the image data to the signal transmitting part during the enable period, and provides the identification data to the signal transmitting part during the blanking part.

In an exemplary embodiment, the timing control part may determine whether the image data of the subsequent frame is the image data for the left-eye or the image data for the right-eye based on the identification data detected during a preset period in the blanking period.

In an exemplary embodiment, the timing control part may generate an inversion control signal which controls a polarity of a data voltage corresponding to the image data based on the identified result.

In an exemplary embodiment, the panel driving part may convert the image data into the data voltage, and may output the data voltage into a voltage of different polarities with respect to a reference voltage based on the inversion control signal.

According to exemplary embodiments of the invention, image data of a data frame received during an enable period of a frame may be determined whether the image data of the data frame is image data for the left-eye or image data for the right-eye based on identification data received during the blanking period of the frame, such that the display quality of the 3D stereoscopic image is substantially increased. In addition an input pin to receive the identification data may be omitted from the timing control part such that the timing control part is substantially simplified.

BRIEF DESCRIPTION OF THE DRAWINGS

The above and other features and advantages of the invention will become more apparent by describing in detailed exemplary embodiments thereof with reference to the accompanying drawings, in which:

FIG. 2A is a block diagram illustrating an exemplary embodiment of an interface part of FIG. 1;

FIG. 2B is a table illustrating an exemplary embodiment of a plurality of signals corresponding to an input pin of a signal transmitting part and an output pin of a signal receiving part in FIG. 2A;

DETAILED DESCRIPTION OF THE INVENTION

Figure 1:
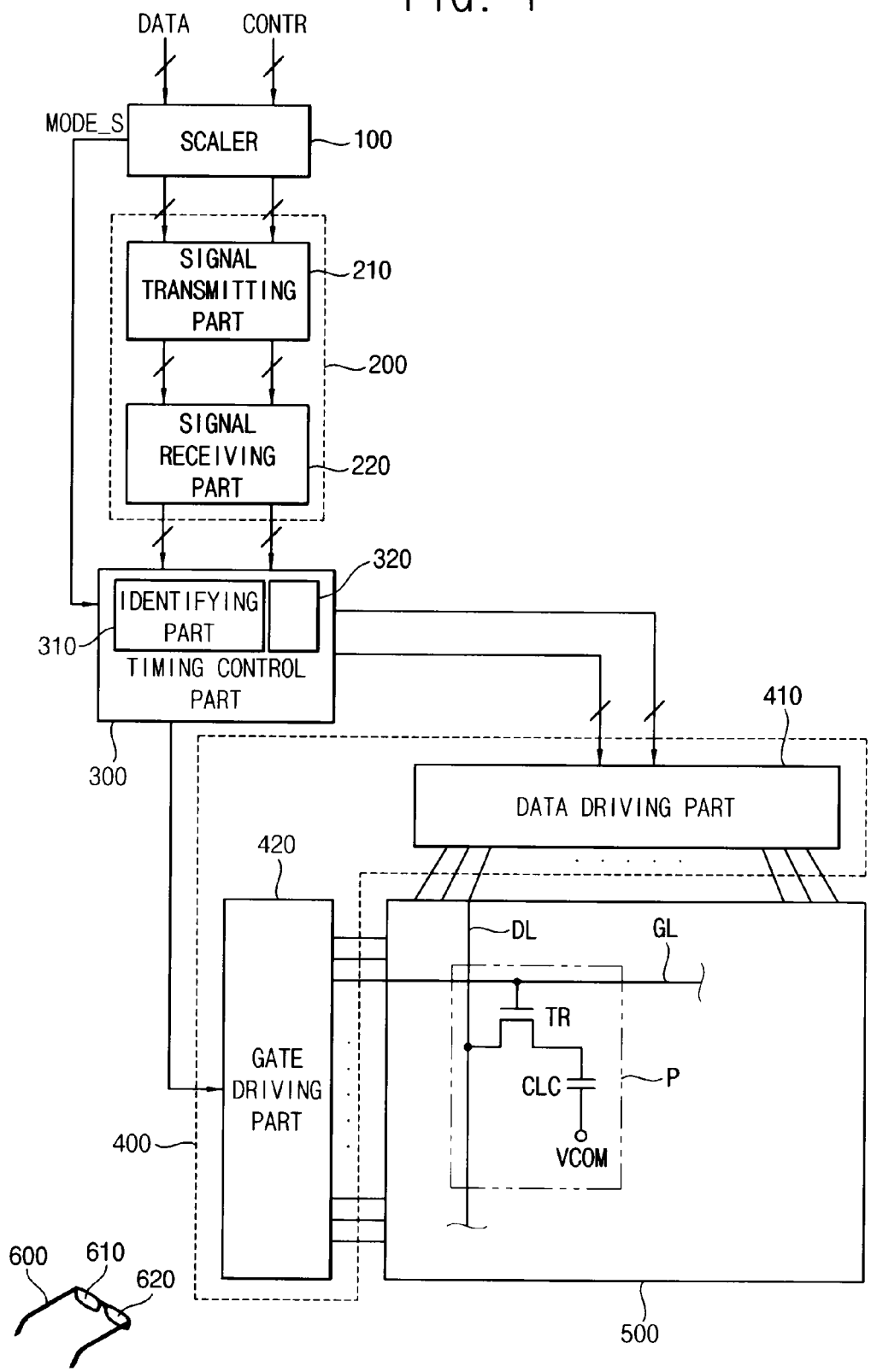
FIG. 1 is a block diagram illustrating an exemplary embodiment of a display apparatus according to the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, "connected" includes physically and/or electrically connected. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be explained in detail with reference to the accompanying drawings.

FIG. 1 is a block diagram illustrating an exemplary embodiment of a display apparatus according to the invention.

Referring to FIG. 1, the display apparatus includes a scaler 100, an interface part 200, a timing control part 300, a panel driving part 400 and a display panel 500.

The scaler 100 receives an image data DATA and a control signal CONTR. The scaler 100 scales the image data into a data frame corresponding to a resolution of the display panel 500, and outputs an image data of the data frame based on the control signal CONTR. The control signal CONTR may include a horizontal synchronization signal, a vertical synchronization signal, a data enable signal and a dot clock signal. In one exemplary embodiment, for example, the scaler 100 outputs the image data of the data frame during a first period (an enable period) of a frame, and does not output the image data of the data frame during a second period (a blanking period) of the frame based on the vertical synchronization signal.

In one exemplary embodiment, for example, the scaler 100 may receive an image mode signal MODE_S corresponding to types of the image data, e.g., image data of a two-dimensional ("2D") image or image data of a three-dimensional ("3D") stereoscopic image. The scaler 100 scales the image data DATA into the data frame corresponding to the resolution of the display panel 500, and provides the image data of the data frame and the control signal to the interface part 200 during the enable period of the frame.

When the image data DATA are the three-dimensional ("3D") stereoscopic image, the scaler 100 divides the image data DATA into an image data for a left-eye and an image data for a right-eye. The scaler 100 scales the image data for the left-eye into the data frame for the left-eye, and scales the image data for the right-eye into the data frame for the right-eye. The scaler 100 provides an image data of the data frame for the left-eye and the control signal to the interface part 200 during the enable period of a first frame, and provides an image data of the data frame for the right-eye and the control signal to the interface part 200 during the enable period of a second frame. During the blanking period of the first frame, the scaler 100 provides an identification data for the right-eye corresponding to the image data for the right-eye that is transmitted to the interface part 200 during a subsequent frame of the first frame. During the blanking period of the second frame, the scaler 100 provides an identification data for the left-eye corresponding to the image data for the left-eye that is transmitted to the interface part 200 during a subsequent frame of the second frame.

The interface part 200 includes a signal transmitting part 210 and a signal receiving part 220. The signal transmitting part 210 modulates the image data of the data frame, the identification data and the control signal provided from the scaler 100 into a transmission signal based on an interface mode of the interface part 200, and transmits the transmission signal to the signal receiving part 220. The signal receiving part 220 demodulates the transmission signal into an original signal. The original signal includes the image data, the identification data and the control signal.

In one exemplary embodiment, for example, in a 2D mode, the signal transmitting part 210 modulates the image data of the data frame and the control signal into the transmission signal, and transmits the transmission signal to the signal receiving part 220 during the enable period. The signal receiving part 220 demodulates the transmission signal into the image data of the data frame and the control signal.

In a 3D mode, the signal transmitting part 210 modulates the image data of the data frame and the control signal into a first transmission signal and transmits the first transmission signal to the signal receiving part 220 during the enable period. The signal receiving part 220 demodulates the first transmission signal into the image data of the data frame and the control signal. The signal transmitting part 210 modulates the identification data into a second transmission signal, and transmits the second transmission signal to the signal receiving part 220 during the blanking period. The signal receiving part 220 demodulates the second transmission signal into the identification data.

In one exemplary embodiment, for example, during the enable period of the first frame, the signal transmitting part 210 modulates the image data of the data frame for the left-eye and the control signal into the first transmission signal, and transmits the first transmission signal to the signal receiving part 220. During the blanking period of the first frame, the signal transmitting part 210 modulates the identification data for the right-eye that is data information of the subsequent frame into the second transmission signal, and transmits the second transmission signal to the signal receiving part 220. During the enable period of the second frame, the signal transmitting part 210 modulates the image data of the data frame for the right-eye and the control signal into the first transmission signal, and transmits the first transmission signal to the signal receiving part 220. During the blanking period of the second frame, the signal transmitting part 210 modulates the identification data for the left-eye that is the data information of the subsequent frame into the second transmission signal, and transmits the second transmission signal to the signal receiving part 220.

The signal receiving part 220 demodulates the first transmission signal received during the enable period of the first frame into the image data of the data frame for the left-eye and the control signal, and provides the image data of the data frame for the left-eye and the control signal to the timing control part 300. The signal receiving part 220 demodulates the second transmission signal received during the blanking period of the first frame into the identification data for the right-eye, and provides the identification data for the right-eye to the timing control part 300. The signal receiving part 220 demodulates the first transmission signal received during the enable period of the second frame into the image data of the data frame for the right-eye and the control signal, and provides the image data of the data frame for the right-eye and the control signal to the timing control part 300. The signal receiving part 220 demodulates the second transmission signal received during the blanking period of the second frame into the identification data for the left-eye, and provides the identification data for the left-eye to the timing control part 300.

The timing control part 300 may include an identifying part 310 and a memory 320. The timing control part 300 controls an operation of the panel driving part 400 based on the image data of the data frame and the control signal provided from the signal receiving part 220. The timing control part 300 generates a data control signal and a gate control signal to control the operation of the panel driving part 400.

In the 3D mode, the identifying part 310 detects the identification data for the left-eye or the right-eye, and identifies whether the subsequent frame is a frame for the left-eye or the right-eye. In one exemplary embodiment, for example, when the identification data for the left-eye is detected, the identifying part 310 determines that the subsequent frame is the frame for the left-eye. When the identification data for the right-eye is detected, the identifying part 310 determines that the subsequent frame is the frame for the right-eye. The memory 320 stores a reference value, and the identifying part 310 may detect the identification data for the left-eye or the right-eye during a preset period of the blanking period which is preset by the reference value.

The timing control part 300 may control the data driving part 410 based on the data information of the image data of the data frame determined by the identifying part 310. In one exemplary embodiment, for example, in the 3D mode, one picture image may include an image for the left-eye and an image for the right-eye, and the display apparatus processes the image data for the left-eye to display the image for the left-eye and processes the image data for the right-eye to display the image for the right-eye. In one exemplary embodiment, for example, the timing control part 300 generates an inversion control signal based on the data information of the subsequent frame, such that a data voltage of the image data for the left-eye and a data voltage of the image data for the right-eye have the polarities substantially the same as each other with respect to a reference voltage. The data driving part 410 converts the image data for the left-eye and the right-eye received from the timing control part 310 into a data voltage having a first polarity (+) or a second polarity (−) with respect to the reference voltage based on the inversion control signal.

The timing control part 300 may control an operation of a glasses part 600 in the 3D mode. In one exemplary embodiment, for example, the glasses part 600 may include a liquid crystal ("LC") shutter 610 for the left-eye and an LC shutter 620 for the right-eye. The timing control part 300 provides a shutter control signal to the glasses part 600, such that the glasses part 600 controls, e.g., opens and closes, the LC shutters 610 and 620 for the left-eye and the right-eye based on the data information of the subsequent frame. The glasses part 600 may control, e.g., selectively open and close, the LC shutters 610 and 620 for the left-eye and the right-eye in synchronization with the blanking period of the frame. In one exemplary embodiment, for example, the glasses part 600 opens the LC shutter 610 for the left-eye and closes the LC shutter 620 for the right-eye during the blanking period of the first frame in which the image data for the left-eye are outputted to the display panel 500 during the enable period. In addition, the glasses part 600 opens the LC shutter 620 for the right-eye and closes the LC shutter 610 for the left-eye during the blanking period of the second frame, in which the image data for the right-eye are outputted to the display panel 500 during the enable period thereof. Therefore, the glasses part 600 may substantially accurately control, e.g., open and close, the LC shutters 610 and 620 for the left-eye and the right-eye in synchronization with the image for the left-eye and the right-eye displayed in the display panel 500, such that display quality of the 3D stereoscopic image is substantially improved.

The panel driving part 400 includes a data driving part 410 and a gate driving part 420. The data driving part 410 converts the image data into the data voltage having the first polarity or the second polarity with respect to the reference voltage based on the data control signal, and provides the data voltage to the display panel 500. The gate driving part 420 outputs a gate signal to the display panel 500 in synchronization with the data voltage outputted to the display panel 500 based on the gate control signal.

The display panel 500 includes a plurality of pixels, and the pixels display the image. Each of the pixels P includes a switching element TR connected to a data line DL and a gate line GL and an LC capacitor CLC, which is connected to the switching element TR and receives a common voltage VCOM. In one exemplary embodiment, for example, when the switching element TR is turned on by the gate signal applied to the gate line GL, the LC capacitor CLC charges the data voltage applied to the data line DL such that the pixel P displays the image.

FIG. 2A is a block diagram illustrating an exemplary embodiment of an interface part of FIG. 1. FIG. 2B is a table illustrating an exemplary embodiment of a plurality of signals corresponding to input pins of a signal transmitting part and output pins of a signal receiving part in FIG. 2A.

Referring to FIGS. 2A and 2B, the interface part 200 may include the signal transmitting part 210 and the signal receiving part 220. Hereinafter, an exemplary embodiment of the interface part 200 that transmits and receives red, green and blue data of 8 bits using a low voltage differential signaling ("LVDS") mode will be explained, but the invention is not limited thereto.

The signal transmitting part 210 may include a first modulating part 211, a first phase-locked loop ("PLL") 212 and a second modulating part 213. The signal transmitting part 210 includes a plurality of data input channels TxIN0 to TxIN27, a clock input channel TxCLK_IN, four data output channels TxOUT0 to TxOUT3 and a clock output channel TxCLK_OUT.

The first modulating part 211 modulates red data R[0] to R[7] of 8 bits, green data G[0] to G[7] of 8 bits, blue data B[0] to B[7] of 8 bits, a horizontal synchronization signal Hsync, a vertical synchronization signal Vsync, a data enable signal DE, a reset signal RS received through the data input channels TxIN0 to TxIN27 into four data pulse signals.

The first PLL 212 generates a clock pulse signal using a dot clock signal Dot_Clk received through the clock input channel TxCLK_IN.

The second modulating part 213 modulates the four data pulse signals into four pairs of data differential signals having phases opposite to each other, and modulates the clock pulse signal into one pair of clock differential signals having phases opposite to each other. In one exemplary embodiment, for example, the data differential signals and the clock differential signals are transmission signals generated from the signal transmitting part 210.

The signal transmitting part 210 transmits the four pairs of the data differential signals through the output channels TxOUT0 to TxOUT3 to the signal receiving part 220, and transmits the one pair of clock differential signals through the clock output channel TxCLK_OUT to the signal receiving part 220.

The signal receiving part 220 includes a first demodulating part 221, a second demodulating part 222 and a second PLL 223. The signal receiving part 220 may include four data input channels RxIN0 to RxIN3, a clock input channel RxCLK_IN, a plurality of data output channels RxOUT0 to RxOUT27 and a clock output channel RxCLK_OUT.

The first demodulating part 221 demodulates the four pairs of the data differential signals received through the data input channel RxIN0 to RxIN3 into four data pulse signals, and demodulates the one pair of clock differential signals received through the clock input channel RxCLK_IN into the clock pulse signal.

The second demodulating part 222 demodulates the four data pulse signals into the red data R[0] to R[7] of 8 bits, the green data G[0] to G[7] of 8 bits, the blue data B[0] to B[7] of 8 bits, the horizontal synchronization signal Hsync, the vertical synchronization signal Vsync, the data enable signal DE and the reset signal RS.

The second PLL 223 generates the dot clock signal Dot_Clk using the clock pulse signal.

Figure 3:
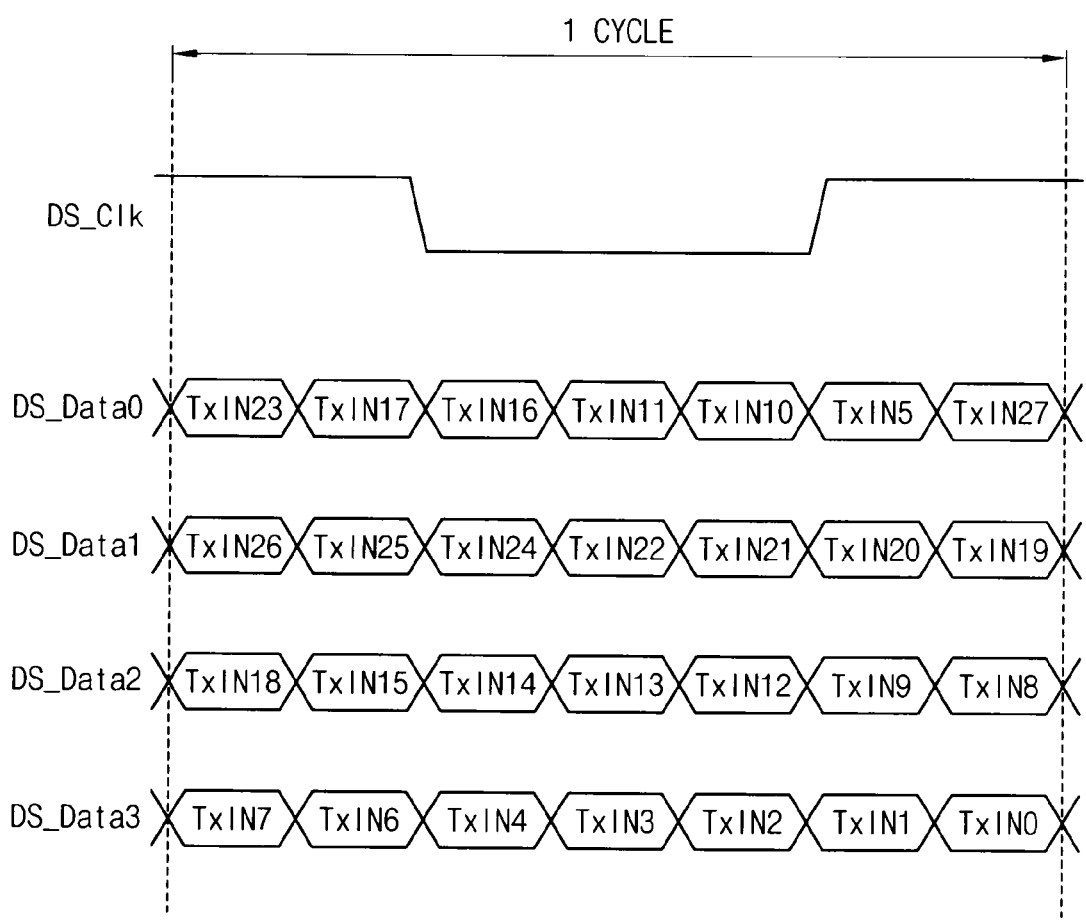
FIG. 3 is a signal timing diagram illustrating data differential signals and clock differential signals modulated by the signal transmitting part of FIG. 2A.

FIG. 3 is a signal timing diagram illustrating the data differential signals and the clock differential signals modulated by the signal transmitting part of FIG. 2A.

Referring to FIGS. 1, 2A, 2B and 3, the four pairs of the data differential signals, e.g., a first data differential signals DS_Data0, a second data differential signals DS_Data1, a third data differential signals DS_Data2 and a fourth data differential signals DS_Data3, are transmitted and received in synchronization with one cycle of the one pair of clock differential signals DS_Clk.

The first data differential signals DS_Data0 includes the reset signal RS, blue data B[7] of a left-first bit, which is the most significant bit ("MSB"), blue data B[6] of a left-second bit, green data G[7] of the left-first bit, green data G[6] of the left-second bit, red data R[7] of the left-first bit, and red data R[6] of the left-second bit received through the data input channels TxIN23, TxIN17, TxIN16, TxIN11, TxIN10, TxIN5 and TxIN27.

The second data differential signals DS_Data1 includes the data enable signal DE, the vertical synchronization signal Vsync, the horizontal synchronization signal Hsync, blue data B[5] of a left-third bit, blue data B[4] of a left-fourth bit, blue data B[3] of a left-fifth bit, and blue data B[2] of a left-sixth bit received through the data input channels TxIN26, TxIN25, TxIN24, TxIN22, TxIN21, TxIN20 and TxIN19.

The third data differential signals DS_Data2 includes blue data B[1] of a left-seventh bit, blue data B[0] of a left-eighth bit, which is the least significant bit ("LSB"), green data G[5] of the left-third bit, green data G[4] of the left-fourth bit, green data G[3] of the left-fifth bit, green data G[2] of the left-sixth bit, and green data G[1] of the left-seventh bit received through the data input channels TxIN18, TxIN15, TxIN14, TxIN13, TxIN21, TxIN20 and TxIN19.

The fourth data differential signals DS_Data3 includes green data G[0] of the left-eighth bit, red data R[5] of the left-third bit, red data R[4] of the left-fourth bit, green data R[3] of the left-fifth bit, red data R[2] of the left-sixth bit, red data R[1] of the left-seventh bit, and red data R[0] of the left-eighth bit received through the data input channels TxIN7, TxIN6, TxIN4, TxIN3, TxIN2, TxIN1 and TxIN0.

In such an embodiment, the scaler 100 provides the red data, the green data, the blue data and the control signals to the signal transmitting part 210 during the enable period. In such an embodiment, in the 3D mode, the scaler 100 provides the identification data for the left-eye or the right-eye to identify the subsequent frame to at least one of the data input channels of the signal transmitting part 210 during the blanking period.

In one exemplary embodiment, for example, when the scaler 100 provides the identification data to the data input channel TxIN22 that receives the blue data B[5] of the left-third bit, the second data differential signals DS_Data1 including the identification data are transmitted to the signal receiving part 220 during the blanking period. The signal receiving part 220 demodulates the second data differential signals DS_Data1 into the identification data for the left-eye or the right-eye, and provides the identification data for the left-eye or the right-eye to the timing control part 300.

Hereinafter, an operation of an exemplary embodiment of the signal transmitting part 210 and the signal receiving part 220 in the 3D mode will now be described.

During the enable period of the frame, the first modulating part 211 modulates the image data for the left-eye or the right-eye into a first pulse signal. The second modulating part 213 modulates the first pulse signal into the four pairs of first differential signals DS_DATA0, DS_DATA1, DS_DATA2 and DS_DATA3 having phases opposite to each other, and transmits the four pairs of first differential signals DS_DATA0, DS_DATA1, DS_DATA2 and DS_DATA3 to the signal receiving part 220.

The first demodulating part 221 demodulates the four pairs of first differential signals DS_DATA0, DS_DATA1, DS_DATA2 and DS_DATA3 into the first pulse signal. The second demodulating part 222 demodulates the first pulse signal into the image data for the left-eye or the right-eye, and provides the image data for the left-eye or the right-eye to the timing control part 300.

During the blanking period of the frame, the first modulating part 211 modulates the identification data for the left-eye or the right-eye into a second pulse signal. The second modulating part 213 modulates the second pulse signal into the four pairs of first differential signals DS_DATA0, DS_DATA1, DS_DATA2 and DS_DATA3 having phases opposite to each other, and transmits the four pairs of first differential signals DS_DATA0, DS_DATA1, DS_DATA2 and DS_DATA3 to the signal receiving part 220.

The first demodulating part 221 demodulates the four pairs of first differential signals DS_DATA0, DS_DATA1, DS_DATA2 and DS_DATA3 into the second pulse signals. The second demodulating part 222 demodulates the second pulse signals into the identification data for the left-eye or the right-eye, and provides identification data for the left-eye or the right-eye to the timing control part 300.

Figure 4:
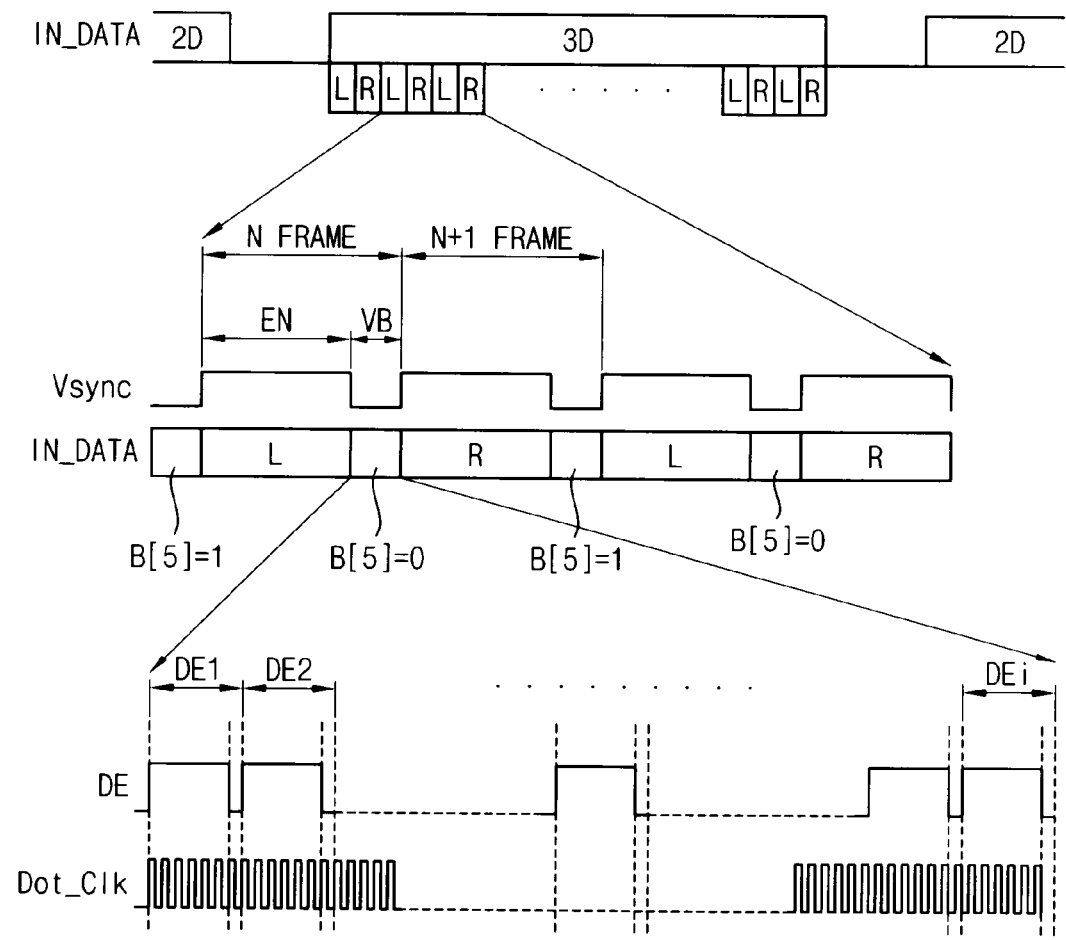
FIG. 4 is a signal timing diagram illustrating input signals received by a timing control part of FIG. 1.
Figure 5:
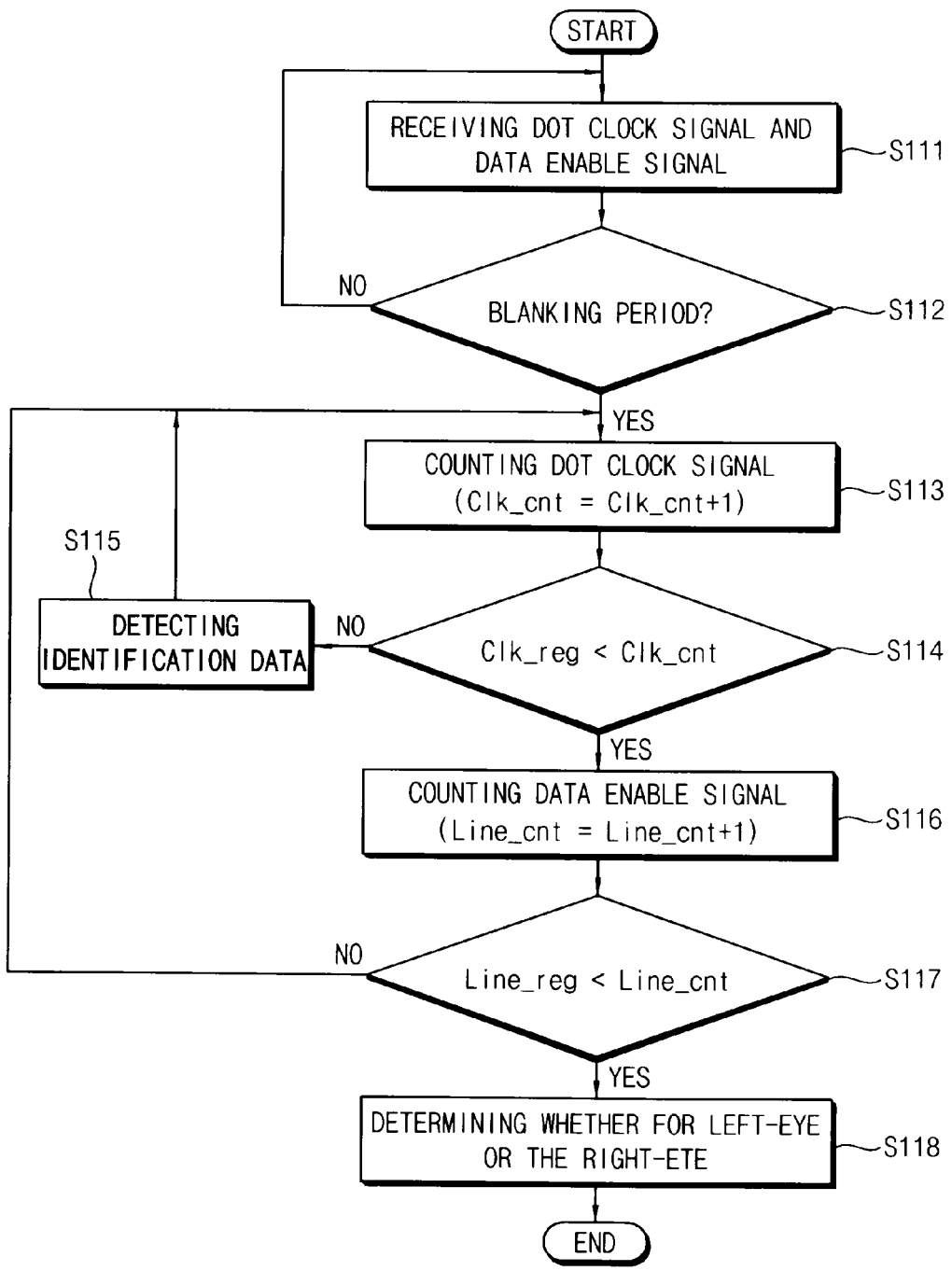
FIG. 5 is a flowchart illustrating an operation of an exemplary embodiment of an identifying part of FIG. 1.

FIG. 4 is a signal timing diagram illustrating input signals received in the timing control part of FIG. 1. FIG. 5 is a flowchart illustrating an operation of the identifying part of FIG. 1.

Referring to FIGS. 1, 4 and 5, the timing control part 300 determines an image mode based on the mode signal MODE_S provided from the scaler 100.

In the 3D mode, the timing control part 300 receives the control signal including the vertical synchronization signal Vsync, the horizontal synchronization signal Hsync, the data enable signal DE, the dot clock signal Dot_Clk, for example, the image data of the data frame for the left-eye or the right-eye, and the identification data for the left-eye or the right-eye, provided from the signal receiving part 220. Hereinafter, an exemplary embodiment, in which the identification data "1" or "0" for the left-eye or the right-eye is transmitted through a channel of the interface part 200, through which the blue data B[5] of the left-third bit is transmitted, to the timing control part 300, will be described for convenience of explanation, but the invention is not limited thereto.

The identifying part 310 detects the identification data received during the blanking period VB of an N-th frame N FRAME, and determines whether the image data received during the enable period EN of the subsequent frame, an (N+1)-th frame (N+1) FRAME, is the image data for the left-eye or the image data for the right-eye.

In one exemplary embodiment, for example, the memory 320 stores a clock reference value Clk_reg and a line reference value Line_reg. When the identification data received during the blanking period VB are the identification data "1" for the left-eye, the identifying part 310 determines the image data of the subsequent frame as the image data for the left-eye. When the identification data received during the blanking period VB are the identification data "0" for the right-eye, the identifying part 310 determines the image data of the subsequent frame as the image data for the right-eye.

The timing control part 300 receives the control signal including the vertical synchronization signal Vsync, the horizontal synchronization signal Hsync, the data enable signal DE, the dot clock signal Dot_Clk, for example, and the image data IN_Data of the data frame for the left-eye or the right-eye (step S111).

The identifying part 310 identifies the blanking period VB based on the data enable signal DE (step S112).

The identifying part 310 counts the number Clk_cnt of the dot clock signal Dot_Clk, and increases the number Clk_cnt of the dot clock signal Dot_Clk one by one (step S113). When the number Clk_cnt of the dot clock signal Dot_Clk in the step S113 is less than or equal to the clock reference value Clk_reg stored in the memory 320 (step S114), the identifying part 310 detects the identification data received in synchronization with the dot clock signal Dot_Clk (step S115).

When the number Clk_cnt of the dot clock signal Dot_Clk in the step S113 is greater than the clock reference value Clk_reg (step S114), the identifying part 310 counts the number Line_cnt of the data enable signal DE and increases the number Line_cnt of the data enable signal DE one by one (step S116). When the number Line_cnt of the data enable signal DE in the step S116 is less than or equal to the line reference value Line_reg stored in the memory 320 (step S117), the identifying part 310 returns to the step S113 and recounts the number of the dot clock signal Clk_cnt. When the number Line_cnt of the data enable signal DE in the step S116 is greater than the line reference value Line_reg (step S117), the identifying part 310 determines whether the image data of the subsequent frame are the image data for the left-eye or the image data for the right-eye based on the identification data detected until now. In one exemplary embodiment, for example, the identifying part 310 determines the image data of the subsequent frame as the image data for the left-eye when most of the detected identification data are "1", and determines the image data of the subsequent frame as the image data for the right-eye when most of the detected identification data are "0".

In one exemplary embodiment, for example, when the clock reference value Clk_reg is "40" and the line reference value Line_reg is "5", the identifying part 310 detects first to forty identification data in synchronization with first to forty dot clock signals of each of first to fifth data enable signals DE1, DE2, . . . , DE5 among i data enable signals DE1, DE2, . . . , DEi (here, i is a natural number) included in the blanking period VB. In one exemplary embodiment, for example, the identifying part 310 may detect 5×40 identification data. Therefore, the identifying part 310 determines whether the image data of the subsequent frame is the image data for the left-eye or the image data for the right-eye using 5×40 identification data.

The timing control part 300 may control the data driving part 410 based on a data information of the subsequent frame.

Figure 6:
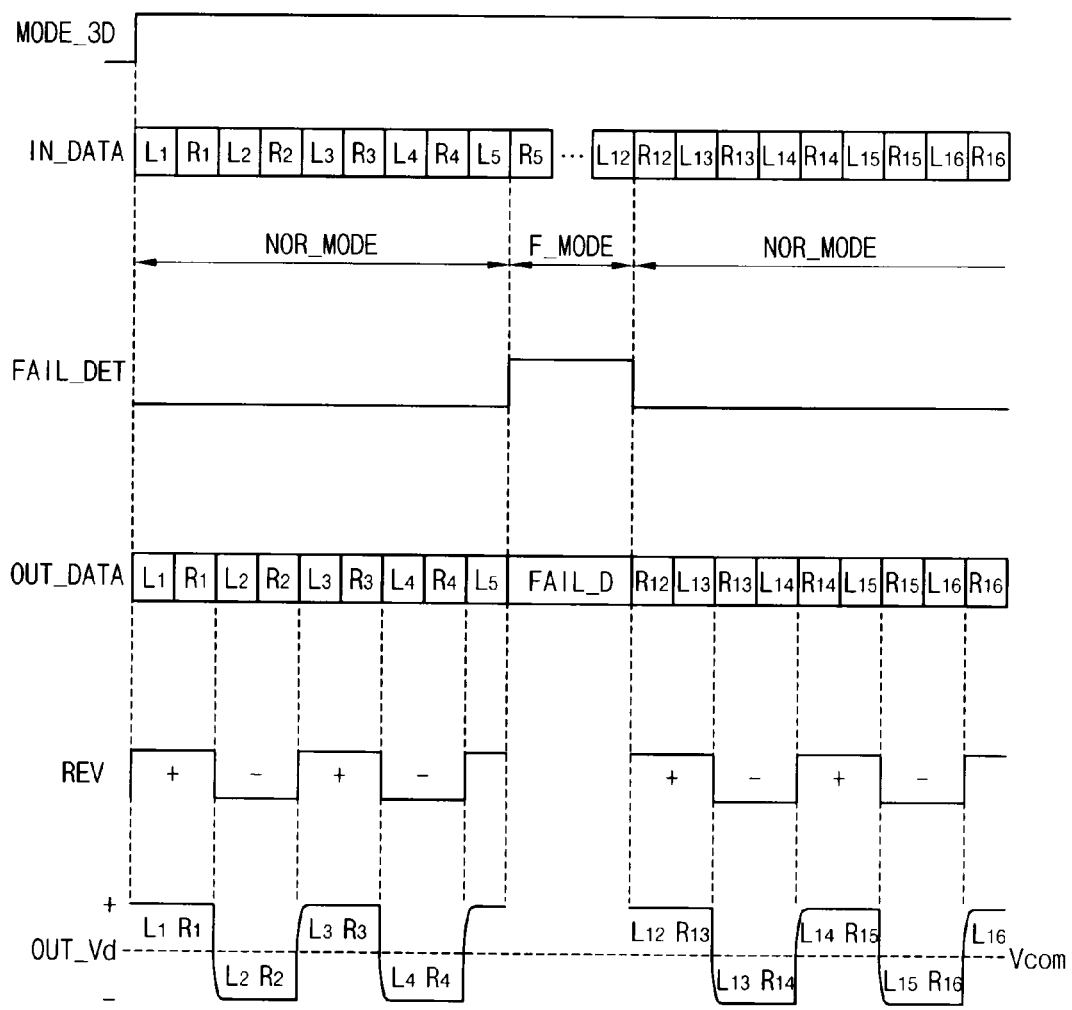
FIG. 6 is a signal timing diagram illustrating an exemplary embodiment of a method of driving a display apparatus.

FIG. 6 is a signal timing diagram illustrating an exemplary embodiment of a method of driving a display apparatus.

Referring to FIG. 6, the display apparatus dose not transmit and receive identification data for the left-eye and the right-eye. In one exemplary embodiment, for example, a scaler of the display apparatus using the method in FIG. 6 transmits image data of a data frame for the left-eye or the right-eye and a control signal to a timing control part through an interface part.

The timing control part changes an image mode based on an image mode signal. When the timing control part receives a 3D mode signal MODE_3D, the timing control part receives a first data frame L1 for the left-eye, a first data frame R1 for the right-eye corresponding to a first picture image, a second data frame L2 for the left-eye, a second data frame R2 for the right-eye corresponding to a second picture image, a third data frame L3 for the left-eye, and a third data frame R3 for the right-eye corresponding to a third picture image, etc. As described above, the timing control part sequentially receives a 3D data frame having the data frames for the left-eye and the right-eye IN_DATA.

The timing control part sequentially outputs the data frames for the left-eye and the right-eye to a data driving part OUT_DATA.

In such an embodiment, the timing control part provides an inversion control signal REV to the data driving part in response to the 3D mode signal MODE_3D. The inversion control signal REV is preset such that the data frames for the left-eye and the right-eye corresponding to the same picture image have the polarities substantially same with each other with respect to a reference voltage.

In one exemplary embodiment, for example, the timing control part generates the inversion control signal REV in response to a high level of the 3D mode signal MODE_3D. Based on the inversion control signal REV, the first data frames L1 and R1 for the left-eye and the right-eye corresponding to the first picture image have a first polarity (+) with respect to the reference voltage, and the second data frames L2 and R2 for the left-eye and the right-eye corresponding to the second picture image have a second polarity (−) with respect to the reference voltage. Therefore, the data driving part outputs data voltages for the left-eye and the right-eye having the polarities substantially the same as each other to a display panel OUT_Vd. In such an embodiment, the display apparatus may be normally driven, for example, driven in a normal mode NOR_MODE.

However, when the display apparatus is abnormally driven by external factors such as an electrostatic, for example, the timing control part generates a fail signal FAIL_DET and drives the display apparatus to a fail mode F_MODE in response to the high level of the fail signal FAIL_DET.

In one exemplary embodiment, for example, in the fail mode F_MODE, the timing control part outputs fail data FAIL_D to display a pattern image preset corresponding to the fail mode F_MODE on the display panel. In one exemplary embodiment, for example, the timing control part may block an input-output of the 3D image data during a partial period of the fail mode F_MODE.

After the fail mode F_MODE, the timing control part drives the display apparatus to the normal mode NOR_MODE. Then, the timing control part receives the 3D image data and outputs the 3D image data in response to a low level of the fail signal FAIL_DET. In such an embodiment, the timing control part may not sequentially output from the data frame for the left-eye corresponding to the picture image, and may sequentially output from the data frame for the right-eye corresponding to the picture image. As shown in FIG. 6, the timing control part may sequentially output from the image frame R12 for the right-eye of a twelfth picture image OUT_DATA.

The timing control part provides the preset inversion control signal REV to the data driving part in response to the low level of the fail signal FAIL_DET. Therefore, the data driving part outputs the image data of a twelfth data frame R12 for the right-eye and a thirteenth data frame L13 for the left-eye into the data voltage of the first polarity (+), and outputs the image data of a thirteenth data frame R13 for the right-eye and a fourteenth data frame R14 for the right-eye into the data voltage of the second polarity (−) OUT_Vd.

In the normal mode NOR_MODE after the fail mode F_MODE, the data driving part outputs the data voltages for the left-eye and the right-eye having the polarities different from each other corresponding to the same picture image.

In such an display apparatus, the image data outputted from the timing control part may not be in synchronization with the set inversion control signal REV in the normal mode NOR_MODE after the fail mode F_MODE such that display quality of the 3D stereoscopic image may be decreased.

Figure 7:
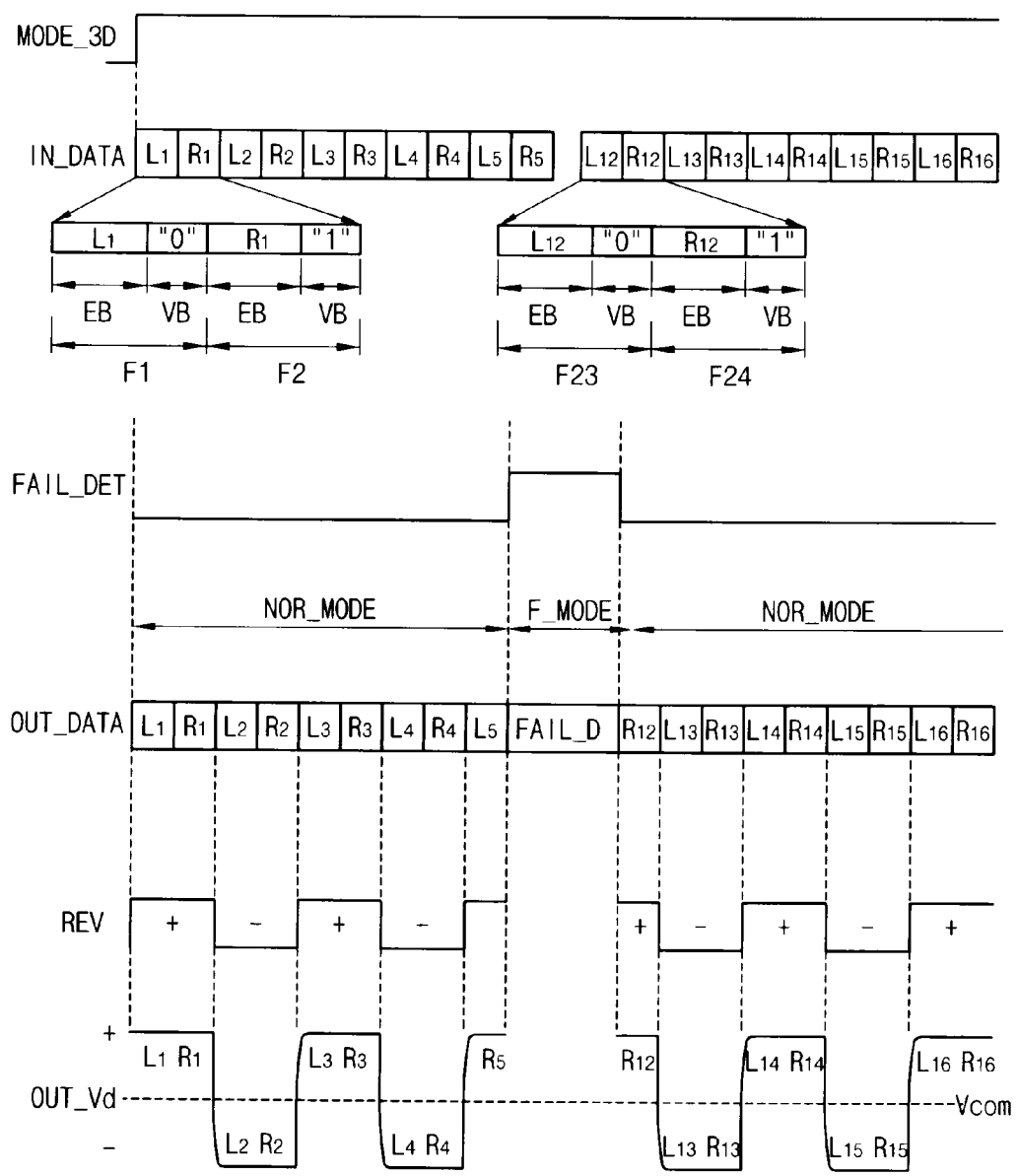
FIG. 7 is a signal timing diagram illustrating an exemplary embodiment of a method of driving the display apparatus of FIG. 1.

FIG. 7 is a signal timing diagram illustrating an exemplary embodiment of a method of driving the display apparatus of FIG. 1.

Referring to FIGS. 1 and 7, the timing control part 300 receives the image data of the data frame for the left-eye or the right-eye, the control signal and the identification data for the left-eye or the right-eye in response to the high level of the 3D mode signal MODE_3D.

The timing control part 300 receives the image data of the data frame during the enable period EN of the first frame F1 and receives the identification data during the blanking period VB of the first frame F1. As shown in FIG. 7, the timing control part 300 sequentially receives a first data frame L1 for the left-eye, a first data frame R1 for the right-eye corresponding to a first picture image, a second data frame L2 for the left-eye, a second data frame R2 for the right-eye corresponding to a second picture image, a third data frame L3 for the left-eye, and a third data frame R3 for the right-eye corresponding to a third picture image, for example, during the enable period of each frame IN_DATA. In such an embodiment, the timing control part 300 receives the identification data "1" or "0" for the left-eye or the right-eye during the blanking period VB of each frame (not shown).

The identifying part 310 detects the identification data of each frame, and determines whether the image data of the subsequent frame are for the left-eye or the right-eye based on the detected identification data. When the detected identification data are for the left-eye "1", the identifying part 310 determines the subsequent frame is for the left-eye, and when the detected identification data are for the right-eye "0", the identifying part 310 determines the subsequent frame is the for the right-eye.

The timing control part 300 sequentially outputs the received the 3D image data, including the first data frame L1 for the left-eye, the first data frame R1 for the right-eye, the second data frame L2 for the left-eye, the second data frame R2 for the right-eye, to the data driving part 410 (OUT_DATA).

The timing control part 300 generates the inversion control signal REV based on the data information of the frame determined by the identifying part 310. In one exemplary embodiment, for example, the timing control part 300 may generate the inversion control signal REV of a second frame F2 to have the same polarity (+) as a first frame F1 based on the data information of the subsequent frame determined based on the identification data "0" detected during the blanking period of the first frame F1.

Therefore, the data driving part 410 outputs data voltages for the left-eye and the right-eye having the polarities substantially the same as each other to the display panel 500 OUT_Vd. In an exemplary embodiment, the display apparatus is normally driven, e.g., is driven in a normal mode NOR_MODE.

In such an embodiment, when the display apparatus is abnormally driven by external factors such as an electrostatic, for example, the timing control part 300 generates a fail signal FAIL_DET and drives the display apparatus to a fail mode F_MODE in response to the high level of the fail signal FAIL_DET.

In the fail mode F_MODE, the timing control part 300 outputs fail data FAIL_D to display a pattern image preset corresponding to the fail mode F_MODE on the display panel. In one exemplary embodiment, for example, the timing control part 300 may block an input-output of the 3D image data during a partial period of the fail mode F_MODE.

After the fail mode F_MODE, the timing control part 300 drives the display apparatus in the normal mode NOR_MODE. Then, the timing control part 300 receives the 3D image data IN_DATA.

As shown in FIG. 7, the timing control part 300 receives a twelfth data frame L12 for the left-eye during the enable period EB, and receives the identification data "0" during the blanking period VB. The identifying part 310 determines that a twenty-fourth frame F24 which is the subsequent frame is an image data for the right-eye based on the identification data "0" detected in the blanking period VB.

The timing control part 300 outputs the 3D image data response to the low level of the fail signal FAIL_DET. As shown in FIG. 7, the timing control part 300 sequentially outputs from the twelfth data frame R12 for the right-eye.

The timing control part 300 generates the inversion control signal REV corresponding to the twenty-fourth frame F24 which is the subsequent frame based on the data information of the twenty-fourth frame F24 determined by the identifying part 310. The twenty-fourth frame F24 is a period in which the data frame R12 for the right-eye of a twelfth picture image is processed. Therefore, the inversion control signal REV of the twenty-fourth frame F24 has the same phase as the twenty-third frame F23 in a period in which the data frame L12 for the left-eye of the twelfth picture image is processed. As shown in FIG. 7, the data driving part 410 outputs the image data of the twelfth data frame R12 of the right-eye into the data voltage of the first polarity (+) based on the inversion control signal REV OUT_Vd.

The data driving part 410 outputs thirteenth data frames L13 and R13 for the left-eye and the right-eye into the data voltage of the second polarity (−) opposite to the first polarity (+) of the twelfth data frame R12 for the right-eye, based on the inversion control signal REV OUT_Vd.

Therefore, the timing control part 300 generates the inversion control signal REV based on the data information of the subsequent frame determined by the identifying part 310, so that the data driving part 410 outputs the image data for the left-eye and the right-eye corresponding to the same picture image into the data voltages for the left-eye and the right-eye having the polarities substantially same with each other.

In such an embodiment, when the display apparatus is operated in the normal mode NOR_MODE after the fail mode F_MODE, the image data outputted from the timing control part are in synchronization with the preset inversion control signal REV such that the display quality of the 3D stereoscopic image is substantially increased.

According to the exemplary embodiments set forth herein, the data frame received during the enable period of the frame may be determined whether the image data of the data frame is an image data for the left-eye or an image data for the right-eye based on the identification data received during the blanking period of the frame such that the display quality of the 3D stereoscopic image is substantially increased, and an additional input pin for receiving the identification data is omitted such that the timing control part is substantially simplified.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A method of processing three-dimensional image data, the method comprising:
   demodulating a first transmission signal into image data which is image data for a left-eye or image data for a right-eye, wherein the first transmission signal is received during an enable period of a frame;
   demodulating a second transmission signal into identification data, wherein the second transmission signal is received during a blanking period of the frame, and the identification data identifies the image data of a subsequent frame as either the image data for the left-eye or the image data for the right-eye;
   identifying whether the image data of the subsequent frame is the image data for the left-eye or the image data for the right-eye based on the identification data; and
   processing the image data based on an identified result from the identifying whether the image data of the subsequent frame is the image data for the left-eye or the image data for the right-eye, and
   wherein the identifying whether the image data of the subsequent frame is the image data for the left-eye or the image data for the right-eye comprises:
   detecting the identification data during a preset period of the blanking period; and
   determining whether the image data of the subsequent frame is the image data for the left-eye or the image data for the right-eye using the identification data detected during the preset period of the blanking period, the preset period is preset by a reference value.

2. The method of claim 1, further comprising:
   modulating the image data into the first transmission signal and transmitting the first transmission signal during the enable period; and
   modulating the identification data into the second transmission signal and transmitting the second transmission signal during the blanking period.

3. The method of claim 2, wherein the modulating the image data into the first transmission signal comprises:
   modulating the image data into a first pulse signal; and
   modulating the first pulse signal into a pair of first differential signals having phases opposite to each other.

4. The method of claim 3, wherein the demodulating the first transmission signal into the image data comprises:
   receiving the pair of first differential signals and demodulating the pair of first differential signals into the first pulse signal; and
   demodulating the first pulse signal into the image data.

5. The method of claim 4, wherein the modulating the identification data into the second transmission signal comprises:
   modulating the identification data which is identification data for the left-eye or identification data for the right-eye into a second pulse signal, wherein the identification data for the left-eye corresponds to the image data for the left-eye, and the identification data for the right-eye corresponds to the image data for the right-eye; and
   modulating the second pulse signal into a pair of second differential signals having phases opposite to each other.

6. The method of claim 5, wherein the demodulating the second transmission signal into the identification data comprises:
   receiving the pair of second differential signals and demodulating the pair of second differential signals into the second pulse signal; and
   demodulating the second pulse signal into the identification data.

7. The method of claim 1, further comprising:
   generating an inversion control signal which controls a polarity of a data voltage corresponding to the image data based on the identified result.

8. The method of claim 7, wherein the processing the image data comprises:
   converting the image data into the data voltage; and
   outputting a voltage of different polarities with respect to a reference voltage as the data voltage based on the inversion control signal.

9. A display apparatus comprising:
   a display panel which displays an image;
   a signal receiving part which receives a first transmission signal during an enable period of a frame and receives a second transmission signal during a blanking period of the frame, wherein the signal receiving part demodulates the first transmission signal into image data which is image data for a left-eye or image data for a right-eye, and demodulates the second transmission signal into identification data which identifies the image data of a subsequent frame as either the image data for the left-eye or the image data for the right-eye;
   a timing control part which detects the identification data and identifies whether the image data of the subsequent frame is the image data for the left-eye or the image data for the right-eye; and
   a panel driving part which processes the image data based on an identified result from the timing control part, and
   wherein the timing control part determines whether the image data of the subsequent frame is the image data for the left-eye or the image data for the right-eye based on the identification data detected during a preset period of the blanking period, the preset period is preset by a reference value.

10. The display apparatus of claim 9, further comprising:
    a signal transmitting part which modulates the image data into the first transmission signal to transmit the first transmission signal during the enable period, and modulates the identification data into the second transmission signal to transmit the second transmission signal during the blanking period.

11. The display apparatus of claim 10, wherein the signal transmitting part comprises:
a data channel which receives the image data and the identification data; and
a control channel which receives a control signal.

12. The display apparatus of claim 10, further comprising:
a scaler which provides the image data to the signal transmitting part during the enable period, and provides the identification data to the signal transmitting part during the blanking period.

13. The display apparatus of claim 10, wherein the signal transmitting part comprises:
a first modulating part which modulates the image data into a first pulse signal; and
a second modulating part which modulates the first pulse signal into a pair of first differential signals having phases opposite to each other.

14. The display apparatus of claim 10, wherein the signal receiving part comprises:
a first demodulating part which receives the first differential signals and demodulates the first differential signals into the first pulse signal; and
a second demodulating part which demodulates the first pulse signal into the image data.

15. The display apparatus of claim 14, wherein
the first modulating part modulates the identification data into a second pulse signal,
the identification data is an identification data for the left-eye corresponding to the image data for the left-eye or an identification data for the right-eye corresponding to the right-eye, and
the second modulating part modulates the second pulse signal into a pair of second differential signals having phases opposite to each other.

16. The display apparatus of claim 15, wherein
the first demodulating part receives the second differential signals and demodulates the second differential signals into the second pulse signal, and
the second demodulating part demodulates the second pulse signal into the identification data.

17. The display apparatus of claim 9, wherein the timing control part generates an inversion control signal which controls a polarity of a data voltage corresponding to the image data based on the identified result.

18. The display apparatus of claim 17, wherein the panel driving part converts the image data into the data voltage, and outputs the data voltage into a voltage of different polarities with respect to a reference voltage based on the inversion control signal.

* * * * *